United States Patent
Nitta et al.

(10) Patent No.: US 6,679,564 B2
(45) Date of Patent: Jan. 20, 2004

(54) AUXILIARY HYDRAULIC PRESSURE SOURCE DEVICE FOR A VEHICLE

(75) Inventors: Hirofumi Nitta, Obu (JP); Michiharu Nishii, Toyota (JP); Tadashi Terazawa, Toyota (JP); Masaki Oishi, Toyota (JP); Kenichi Suzuki, Aichi-ken (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/023,552

(22) Filed: Dec. 21, 2001

(65) Prior Publication Data

US 2002/0093243 A1 Jul. 18, 2002

(30) Foreign Application Priority Data

Dec. 22, 2000 (JP) ........................................ 2000-390337
Dec. 25, 2000 (JP) ........................................ 2000-392785

(51) Int. Cl.[7] .......................... B60T 13/18; B60T 8/42
(52) U.S. Cl. .................. 303/11; 303/115.5; 303/116.1; 303/DIG. 1
(58) Field of Search .................... 303/10, 11, 114.1, 303/115.4, 115.5, 116.1, 116.2, DIG. 1, DIG. 2, DIG. 11

(56) References Cited

U.S. PATENT DOCUMENTS

| | | | | |
|---|---|---|---|---|
| 4,880,282 A | * | 11/1989 | Makino et al. | 303/116.2 |
| 5,000,520 A | | 3/1991 | Schmitt | |
| 5,197,787 A | * | 3/1993 | Matsuda et al. | 303/10 |
| 5,221,125 A | * | 6/1993 | Okochi et al. | 303/10 |
| 5,373,454 A | * | 12/1994 | Kanda et al. | 700/282 |
| 5,413,404 A | * | 5/1995 | Inagawa | 303/122.12 |
| 5,791,745 A | * | 8/1998 | Sakakibara | 303/11 |
| 6,092,878 A | * | 7/2000 | Watanabe | 303/115.4 |
| 6,132,012 A | * | 10/2000 | Ishii | 303/122.12 |
| 6,155,653 A | * | 12/2000 | Borchert | 303/11 |
| 6,234,148 B1 | * | 5/2001 | Hartke et al. | 123/447 |
| 6,367,890 B1 | * | 4/2002 | Hachtel | 303/115.4 |

FOREIGN PATENT DOCUMENTS

| | | | |
|---|---|---|---|
| DE | 19828552 C1 | * | 2/2000 |
| JP | 8-268256 A | | 10/1996 |
| WO | WO-9934187 A1 | * | 7/1999 |

OTHER PUBLICATIONS

US 2002/0130549 to Harris et al.*

* cited by examiner

Primary Examiner—Matthew C. Graham
Assistant Examiner—Melody M. Burch
(74) Attorney, Agent, or Firm—Burns, Doane, Swecker & Mathis, LLP

(57) ABSTRACT

An auxiliary vehicle hydraulic pressure source device includes a hydraulic pressure pump pressurizing and discharging fluid, an accumulator accumulating fluid pressurized and discharged by the hydraulic pressure pump, a hydraulic pressure detector continuously detecting the accumulator hydraulic pressure, and a controller controlling operation of the hydraulic pressure pump based on a comparison of the detection result of the hydraulic pressure detector with a predetermined target pressure. The controller includes a pressure difference calculator calculating the pressure difference between the detection result of the hydraulic pressure detector and the predetermined target pressure, a pressure change calculator calculating a pressure change of the accumulator hydraulic pressure per unit time based on the detection result of the hydraulic pressure detector, and an adjusting device adjusting operation of fluid accumulated in the accumulator by operation of the hydraulic pressure pump based on the pressure difference and the pressure change.

4 Claims, 12 Drawing Sheets

AUXILIARY HYDRAULIC PRESSURE SOURCE DEVICE FOR A VEHICLE

This application is based on and claims priority under 35 U.S.C. § 119 with respect to Japanese Application No. 2000-390337 filed on Dec. 22, 2000 and Japanese Application No. 2000-392785 filed on Dec. 25, 2000, the entire content of both of which is incorporated herein by reference.

BACKGROUND OF THE INVENTION

A known brake system for a vehicle is disclosed in U.S. Pat. No. 5,000,520. The disclosed vehicle brake system includes a master cylinder and an auxiliary hydraulic pressure source. The master cylinder is a hydraulic pressure generating device for generating brake hydraulic pressure in response to operation of a brake pedal. The auxiliary hydraulic pressure source is provided with a hydraulic pressure pump and an accumulator. Power hydraulic pressure of the auxiliary hydraulic pressure source is controlled by a pressure switch connected to the auxiliary hydraulic pressure source. The pressure switch is closed when power hydraulic pressure of the auxiliary hydraulic pressure source reaches a lower threshold pressure value and is opened when power hydraulic pressure of the auxiliary hydraulic pressure source reaches an upper threshold pressure value.

In the vehicle brake system mentioned above, a predetermined difference between the upper threshold pressure value and the lower threshold pressure value may need to be maintained so as not to cause fluctuated operation of the pressure switch due to hysteresis of the pressure switch. Therefore, power hydraulic pressure of the auxiliary hydraulic pressure source may be varied between the upper threshold pressure value and the lower threshold pressure value.

Further, according to the vehicle brake system mentioned above, when the vehicle brake system malfunctions, for example when a contact of a relay for a switching operation of an electric motor malfunctions, an accumulator hydraulic pressure can be maintained within a predetermined pressure level by a pressure switch and a relay. In this case, the accumulator hydraulic pressure corresponds to the power hydraulic pressure outputted from the auxiliary hydraulic pressure source. Further, when the accumulator hydraulic pressure is decreased and falls below the lower threshold pressure value, a malfunction signal is sent by the other pressure switch. Therefore, the electric motor can be driven by the other relay.

However, one of the known accumulators for the above-disclosed brake system is an accumulator which is provided with a cylinder and a piston slidably disposed in the cylinder. Nitrogen gas is sealed in a gas sealed chamber defined between the cylinder and the piston. When the accumulator hydraulic pressure is increased, the gas sealed chamber is compressed and is further maintained within a predetermined pressure range. The above described accumulator requires a sealing mechanism for sealing the gas sealed chamber.

Recent developments have lead to a down-sizing of the accumulator. To meet this demand, it is necessary to accurately detect the fluid accumulated in the accumulator. Further, a desired amount of fluid is required to be accumulated in the accumulator. Therefore, the ON-OFF control by the known pressure switch is replaced with a pressure sensor which can consecutively detect the accumulator hydraulic pressure. The pressure sensor detects the accumulator hydraulic pressure and estimates the amount of fluid accumulated in the accumulator based upon the detected hydraulic pressure value. However, with the accumulator having the above-described structure, fluid may not be accumulated in the accumulator corresponding to the pressure increase.

Accordingly, the above-described vehicle brake systems are susceptible of certain improvements with respect to having the auxiliary hydraulic pressure source provided with the hydraulic pressure pump and the accumulator. The hydraulic pressure pump needs to be properly controlled based upon the accumulator hydraulic pressure monitored consecutively or continuously so that a predetermined amount of fluid can be accumulated in the accumulator.

Another known brake system for a vehicle is disclosed in published Japanese Patent Application Toku-Kai-Hei 8-268256. The power hydraulic pressure of a hydraulic pressure pump is controlled in response to the sum of the brake controlling pressure based upon a vehicle driving condition and margin pressure based upon brake control. According to the above-described vehicle brake system, brake fluid supplied by the hydraulic pressure pump may fluctuate when a brake operation is repeatedly performed.

Accordingly, the disclosed vehicle brake system is susceptible of certain improvements with respect to providing an auxiliary hydraulic pressure source for supplying brake hydraulic pressure which is less variable.

SUMMARY OF THE INVENTION

An auxiliary hydraulic pressure source device for a vehicle according to one aspect of the invention includes a hydraulic pressure pump for pressurizing and discharging fluid, an accumulator for accumulating the fluid pressurized and discharged by the hydraulic pressure pump, hydraulic pressure detecting means for continuously detecting the accumulator hydraulic pressure, and control means for controlling operation of the hydraulic pressure pump in accordance with a comparison result obtained by comparing the detection result of the hydraulic pressure detecting means with a predetermined target pressure. The control means includes a pressure difference calculating means for calculating a pressure difference between the detection result of the hydraulic pressure detecting means and the predetermined target pressure, a pressure change calculating means for calculating a pressure change of the accumulator hydraulic pressure per unit time based upon the detection result of the hydraulic pressure detecting means, and adjusting means for adjusting an accumulating operation of the fluid accumulated in the accumulator by the operation of the hydraulic pressure pump based on the pressure difference and the pressure change of the accumulator hydraulic pressure per unit time.

An auxiliary hydraulic pressure source device for a vehicle according to another aspect of the invention includes a hydraulic pressure pump for pressurizing and discharging fluid, an accumulator for accumulating the fluid pressurized and discharged by the hydraulic pressure pump, a hydraulic pressure detecting means for detecting the accumulator hydraulic pressure continuously, and control means for controlling operation of the hydraulic pressure pump in accordance with a comparison result obtained by comparing the detection result of the hydraulic pressure detecting means with a predetermined pump-drive-starting reference pressure and a predetermined pump-drive-stopping reference pressure. The control means includes pressure change calculating means for calculating a pressure change of the accumulator hydraulic pressure per unit time based upon the detection result of the hydraulic pressure detecting means, comparing means for comparing the calculation result of the pressure change calculating means with a predetermined value, and adjusting means for adjusting an accumulating operation of the fluid accumulated in the accumulator by the operation of the hydraulic pressure pump in accordance with the comparison result of the comparing means.

According to another aspect of the invention, a method for controlling power hydraulic pressure supplied to an accumulator involves pressurizing and discharging fluid through operation of a hydraulic pump and accumulating the pressurized and discharged fluid in an accumulator, continuously detecting an accumulator hydraulic pressure in the accumulator, controlling operation of the hydraulic pressure pump based on a comparison of the detected accumulator hydraulic pressure with a predetermined target pressure, calculating a pressure difference between the detected accumulator hydraulic pressure and the predetermined target pressure, calculating a pressure change of the accumulator hydraulic pressure per unit time based upon the detected accumulator hydraulic pressure, and adjusting the fluid accumulated in the accumulator through operation of the hydraulic pressure pump based on the calculated pressure difference and the calculated pressure change of the accumulator hydraulic pressure per unit time.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Figure 1:
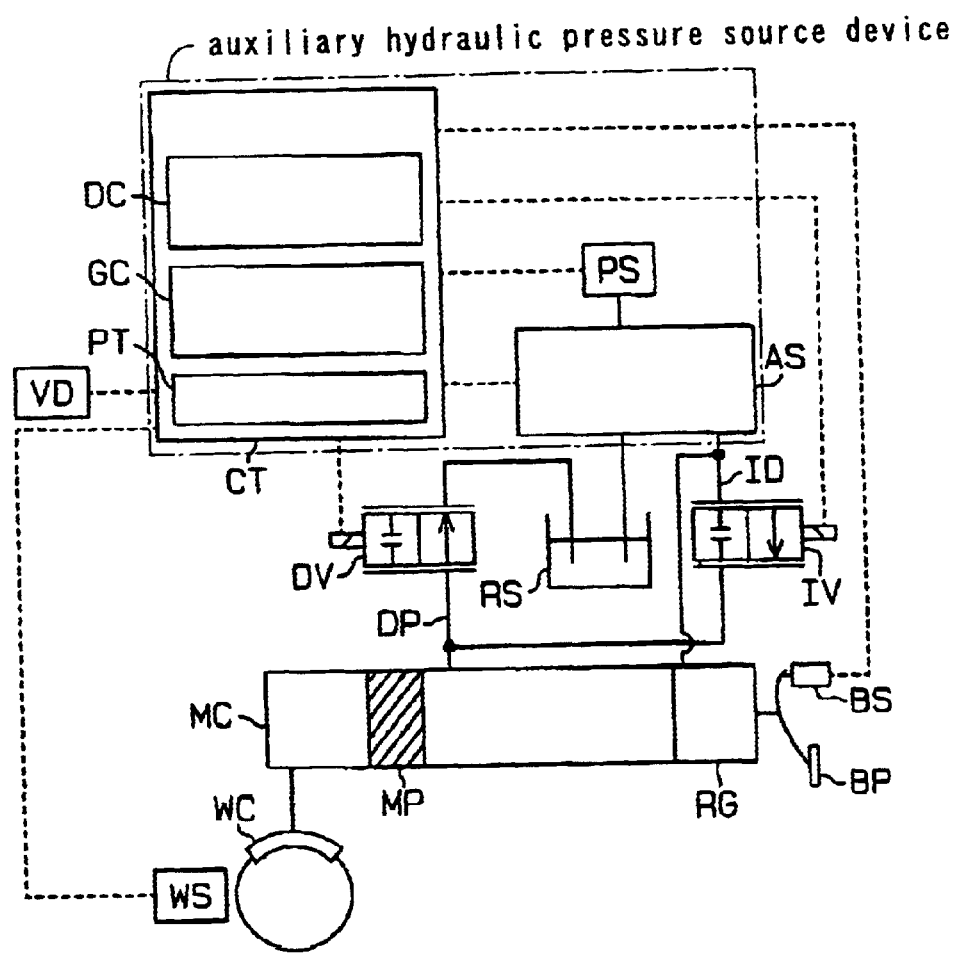
FIG. 1 is a schematic illustration of a vehicle brake system provided with an auxiliary hydraulic pressure source according to a first embodiment of the present invention.

Referring to FIG. 1, a brake system for a vehicle according to a preferred embodiment of the present invention is principally provided with a master cylinder MC, an auxiliary hydraulic pressure source AS, and a regulator RG. The master cylinder MC is provided with a master piston MP movable in a forward direction (i.e., to the left in FIG. 1) in response to operation of a brake pedal or brake operating member BP. Therefore, the pressure of brake fluid from a reservoir RS is increased. The increased brake fluid pressure is supplied to wheel brake cylinders WC which are each operatively mounted on one of the wheels of the vehicle.

The auxiliary hydraulic pressure source AS increases brake fluid from the reservoir RS up to a predetermined pressure level and then outputs power hydraulic pressure. The regulator RG is connected to the auxiliary hydraulic pressure source AS via a hydraulic pressure passage ID for a pressure increase and is further connected to the reservoir RS via a hydraulic pressure passage DP for a pressure decrease. The regulator RG regulates power hydraulic pressure outputted from the auxiliary hydraulic pressure source AS to a predetermined pressure level and moves the master piston MP in the forward direction based on the regulated power hydraulic pressure.

A pressure increasing valve IV, which is a normally-closed type linear solenoid valve, is provided in the hydraulic pressure passage ID. A pressure decreasing valve DV, which is a normally-open type linear solenoid valve, is provided in the hydraulic pressure passage DP. The respective valves IV, DV are electrically connected to a control means or controller CT.

The control means CT controls electric current supplied to each valve IV and DV to control the opening or closing operation of each hydraulic pressure passage IP, DP. Therefore, hydraulic pressure to be fed into the regulator RG is controlled to reach a predetermined pressure level which is equal to or above the atmospheric pressure level. The control means CT serves as an estimating means DC for estimating a difference of an accumulator hydraulic pressure Pac, a calculating means GC for calculating an inclination of the accumulator hydraulic pressure Pac, and a hydraulic pressure control means PT for controlling hydraulic pressure.

Figure 7:
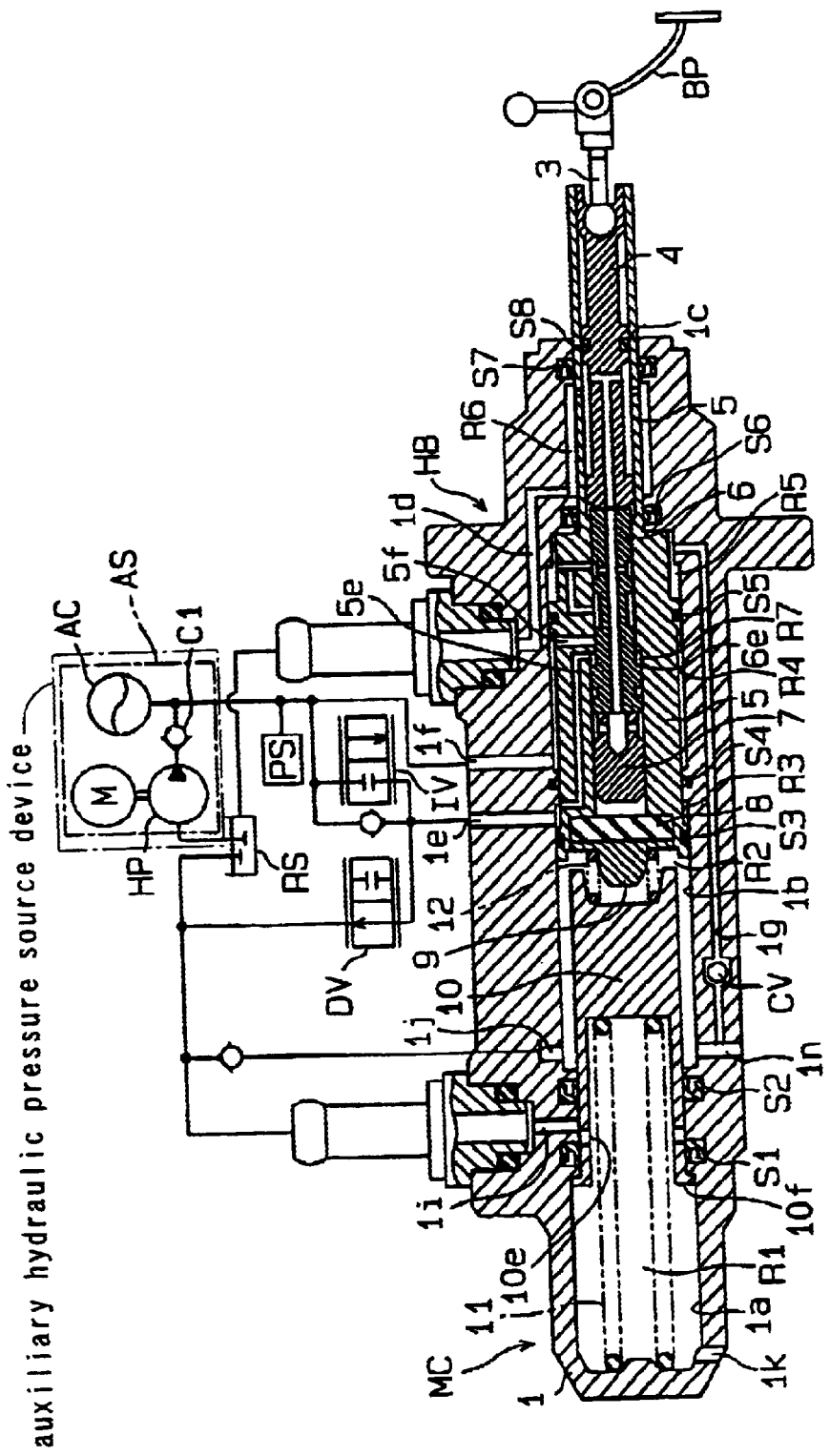
FIG. 7 is a cross-sectional view of the entire hydraulic pressure brake device included in the vehicle brake system illustrated in FIG. 1.

As shown in FIG. 7, the auxiliary hydraulic pressure source AS is provided with an electric motor M, a hydraulic pressure pump HP, a check valve C1, and an accumulator AC. The hydraulic pressure pump HP is driven by the electric motor M. The input side of the hydraulic pressure pump HP is connected to the reservoir RS and the output side of the hydraulic pressure pump HP is connected to the accumulator AC via the check valve C1. The output side of the hydraulic pressure pump HP is further connected to an inlet port If of a hydraulic pressure booster HB, which is described in more detail below, and is connected to another inlet port 1e via the pressure increasing valve IV. A pressure sensor PS serving as a detecting means for detecting an accumulator hydraulic pressure Pac, is connected to the accumulator AC for monitoring power hydraulic pressure outputted from the auxiliary hydraulic pressure source AS. Therefore, the outputted power hydraulic pressure is maintained at a predetermined hydraulic pressure level.

Referring again to FIG. 1, a vehicle distance sensor VD is mounted on the vehicle and detects the distance towards the vehicle running ahead (i.e., the distance to the next vehicle positioned ahead). The pressure sensor PS detects the power hydraulic pressure outputted from the auxiliary hydraulic pressure source AS, a wheel speed sensor WS detects the rotating speed of the vehicle wheels, and a brake pedal switch BS detects the operation of the brake pedal BP. The sensors VD, PS, WS and the brake pedal switch BS are respectively electrically connected to the control means CT and transmit detected signals to the control means CT.

Figure 2:
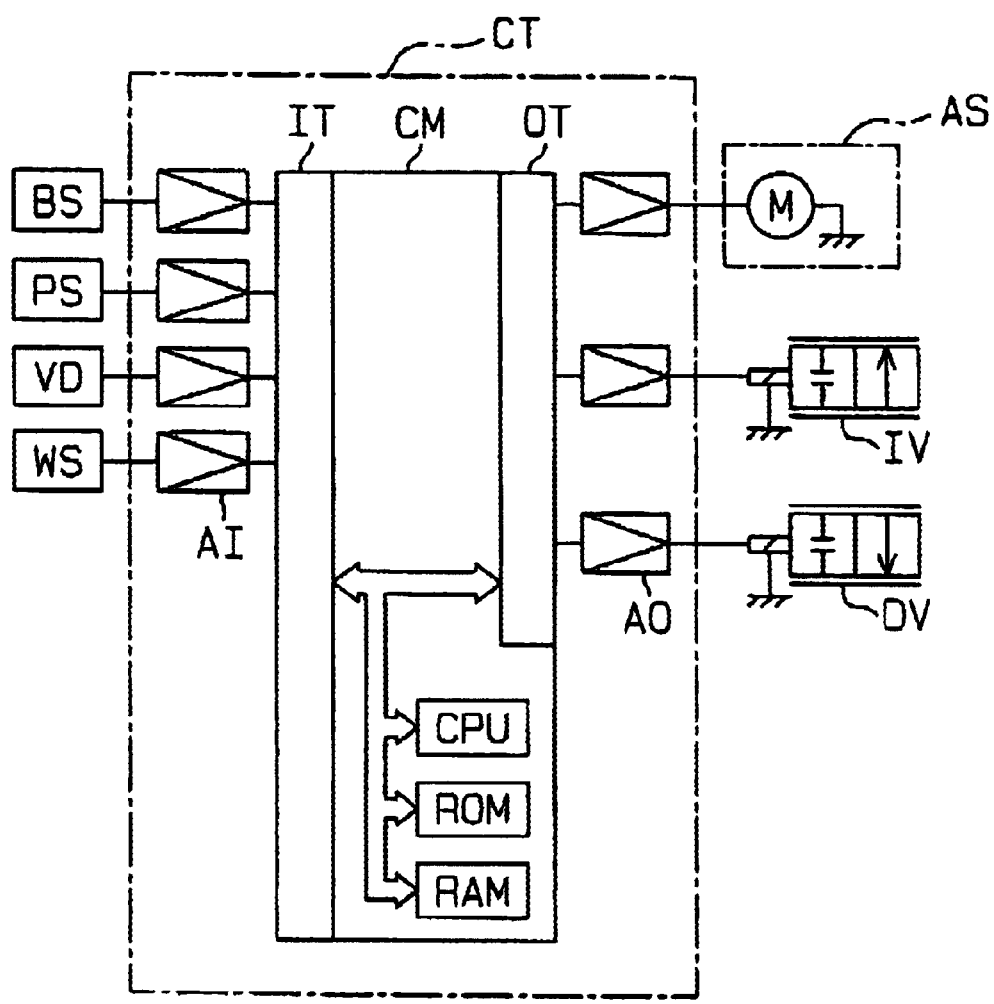
FIG. 2 is a schematic illustration of the control means used in the vehicle brake system illustrated in FIG. 1.

Referring to FIG. 2, the control means CT controls electric current supplied to the respective valves IV, DV based upon signals from the above-described sensors and switch. The electric motor M is also electrically connected to the control means CT and is operatively driven by the control means CT. In this regard, the control CT generally or a part thereof can function as an adjusting means controlling operation of the hydraulic pressure pump. The control means CT includes a microcomputer CM provided with a CPU (central processing unit), a ROM (read-only memory), a RAM (random access memory), an input interface IT, and an output interface OT. The ROM memorizes a program performed following the flow chart illustrated in FIG. 3. The CPU performs the program while an ignition switch is turned ON. The RAM temporarily memorizes variable data that is necessary to perform or carry out the program. The signals detected by the brake pedal switch BS and the sensors PS, VD, WS are inputted to the input interface IT via respective amplifying circuits AI and are then inputted to the CPU. Control signals are respectively outputted to the electric motor M, the pressure increasing valve IV, and the pressure decreasing valve DV from the output interface OT via respective driving circuits AO.

As described above, when the ignition switch is turned ON, the control means CT controls electric current supplied to the respective valves IV, DV, and controls the power hydraulic pressure outputted from the auxiliary hydraulic pressure source AS to be maintained at the predetermined pressure level based upon a predetermined program performed by the microcomputer CM.

Figure 3:
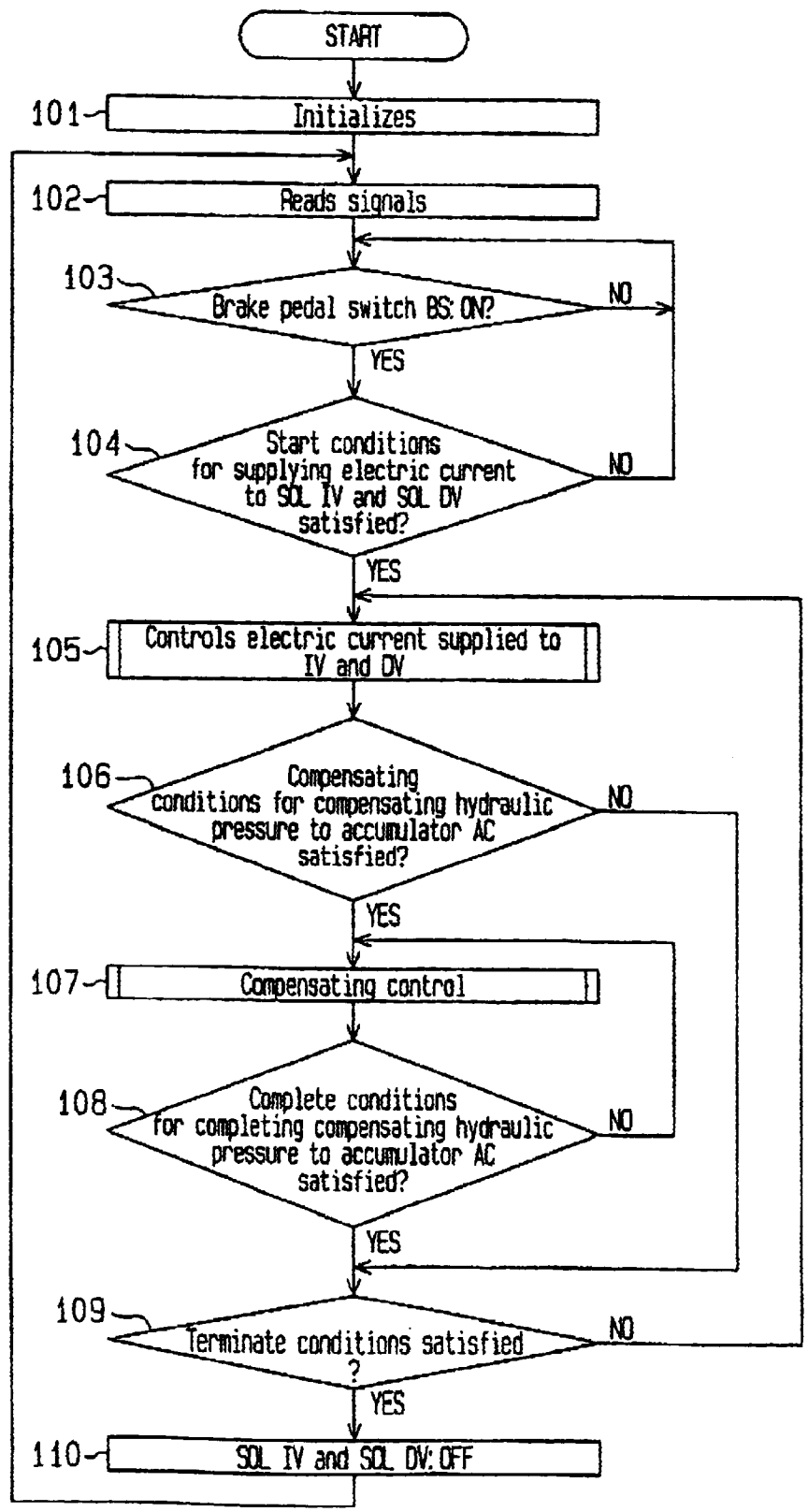
FIG. 3 is a flow chart setting forth a program for controlling power hydraulic pressure supplied to an accumulator from a hydraulic pressure pump according to the first embodiment of the present invention.

Referring to the flow chart shown in FIG. 3, the control of the respective valves IV, DV, and the control of the power hydraulic pressure outputted from the auxiliary hydraulic pressure source AS, is as follows. At step 101, the microcomputer CM is initialized to clear various calculated values. At step 102, the microcomputer CM reads the signals detected by the brake pedal switch BS and the sensors PS, VD, WS. At step 103, the microcomputer CM determines whether or not the brake pedal switch BS is turned ON in response to a depressing operation of the brake pedal BP. When the brake pedal switch BS is turned ON in response to the depressing operation of the brake pedal BP, the program proceeds to step 104 to determine whether or not the start conditions for performing the control of electric current supplied to the respective valves IV, DV are satisfied. The start conditions are satisfied when an automatic brake control is required based upon the vehicle distance relative to the vehicle running ahead as detected by the sensor VD and the vehicle's own speed. The vehicle's own speed is calculated based upon the vehicle wheel rotating speed detected by the sensor WS. The automatic brake control is performed regardless of the operation of the brake pedal BP and results in the generation of a braking force. Therefore, the automatic brake control is effectively performed to prevent the vehicle from crashing into the vehicle running ahead. When the microcomputer CM determines in step 104 that the start conditions to perform the automatic brake control are satisfied, the program proceeds to step 105.

At step 105, the microcomputer CM controls the electric current supplied to the respective valves IV, DV so as to control the opening or closing operation of the respective hydraulic pressure passages IP, DP. Next, at step 106, the microcomputer CM determines whether or not the hydraulic pressure compensating conditions for compensating the hydraulic pressure to the accumulator AC are satisfied, with this determination being based upon a pressure value Pr of the accumulator hydraulic pressure Pac detected by the pressure sensor PS.

The pressure sensor PS detects the pressure value Pr of the accumulator hydraulic pressure Pac. The estimating means DC for estimating the difference of the accumulator hydraulic pressure Pac calculates the difference of the accumulator hydraulic pressure Pac as follows: Pd=Ptgt−Pr. "Ptgt' designates a target pressure value of the accumulator hydraulic pressure Pac.

Figure 4:
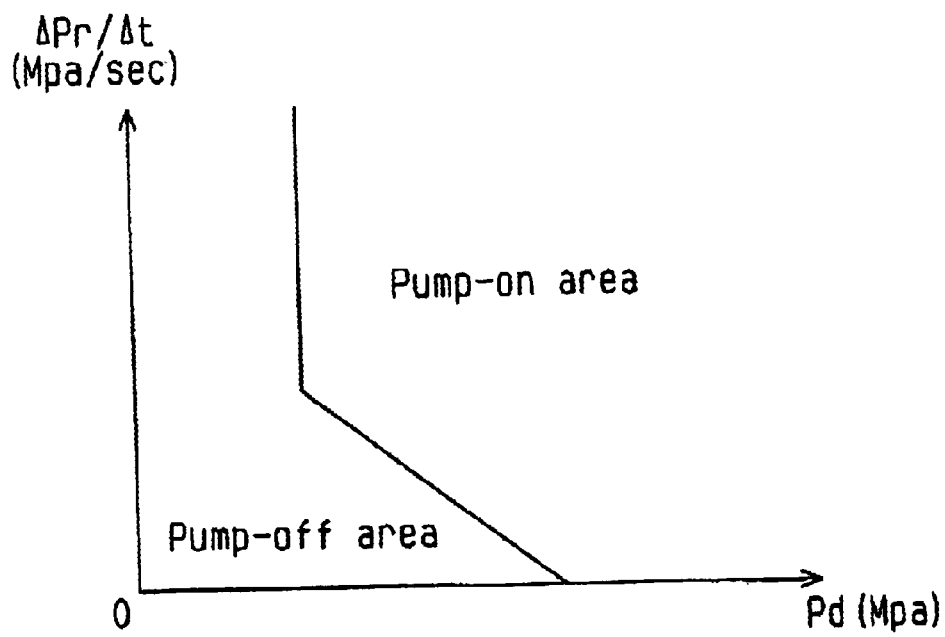
FIG. 4 is a control map for driving the hydraulic pressure pump according to the first embodiment of the present invention.

The calculating means GC for calculating the inclination of the accumulator hydraulic pressure Pac calculates the inclination of the accumulator hydraulic pressure Pac as follows: $\Delta Pr/\Delta t$. The microcomputer CM determines whether or not the hydraulic pressure compensating conditions are satisfied based upon the difference of the accumulator hydraulic pressure Pac (Pd) and the inclination of the accumulator hydraulic pressure Pac ($\Delta Pr/\Delta t$). Further, the microcomputer CM controls the driving of the hydraulic pressure pump HP so as to compensate the hydraulic pressure to the accumulator AC with reference to the control map shown in FIG. 4 for driving the hydraulic pressure pump HP. When the difference of the accumulator hydraulic pressure Pac (Pd) and the inclination of the accumulator hydraulic pressure Pac ($\Delta Pr/\Delta t$) are positioned at the right-hand side area (Pump-on area) of a border line comprised of two lines as shown in FIG. 4, the hydraulic pressure compensating conditions are satisfied, wherein the hydraulic pressure pump HP is actuated. On the other hand, when the difference of the accumulator hydraulic pressure Pac (Pd) and the inclination of the accumulator hydraulic pressure Pac ($\Delta Pr/\Delta t$) are positioned at the left-hand side area (Pump-off area) of the border line in FIG. 4, the hydraulic pressure compensating conditions are not satisfied, wherein the hydraulic pressure pump HP is not actuated.

Figure 5:
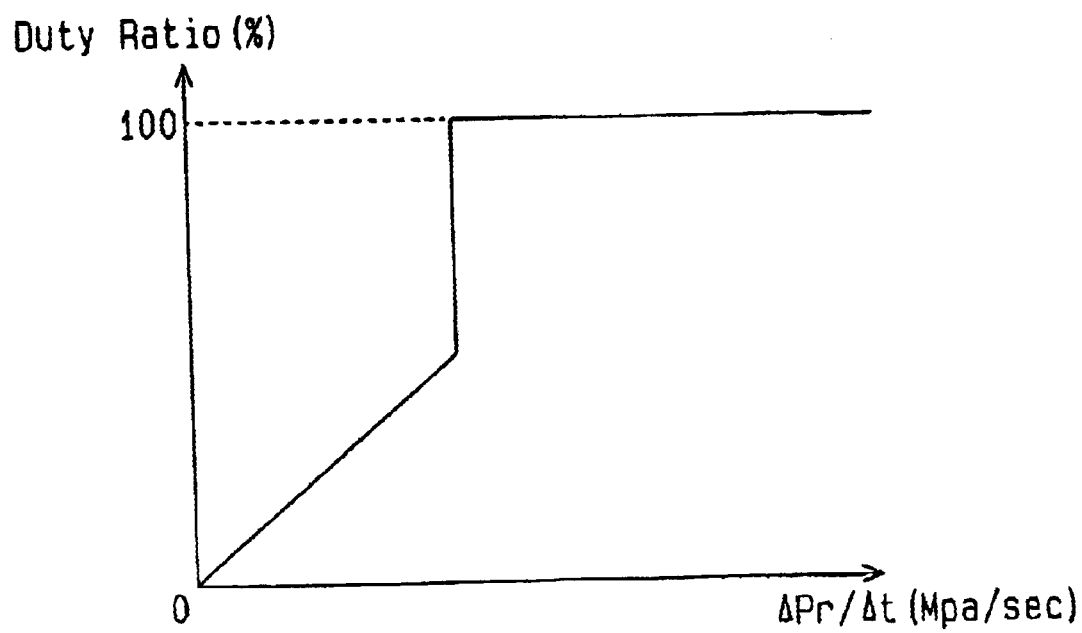
FIG. 5 is another control map for driving the hydraulic pressure pump according to the first embodiment of the present invention.

When the microcomputer CM determines at step 106 that the hydraulic pressure compensating conditions are satisfied, the program then proceeds to step 107. The hydraulic pressure control means PT drives the electric motor M and further actuates the hydraulic pressure pump HP to compensate hydraulic pressure into the accumulator AC. At step 107, the hydraulic pressure control means PT determines a duty ratio of the electric current supplied to the electric motor M corresponding to the inclination of the accumulator hydraulic pressure Pac ($\Delta Pr/\Delta t$), with reference to the control map shown in FIG. 5 for driving the hydraulic pressure pump HP. When the inclination of the accumulator hydraulic pressure Pac ($\Delta Pr/\Delta t$) is large, the duty ratio of the electric current supplied to the electric motor M is increased so that hydraulic fluid discharged from the hydraulic pressure pump HP is increased.

According to the first embodiment of the present invention, the hydraulic fluid discharged from the hydraulic pressure pump HP is controlled based upon the above-described program. However, if desired, the hydraulic fluid outputted from the hydraulic pressure pump HP may be controlled by a hydraulic pressure sensor (not shown) provided at a discharging port of the hydraulic pressure pump HP.

Figure 6:
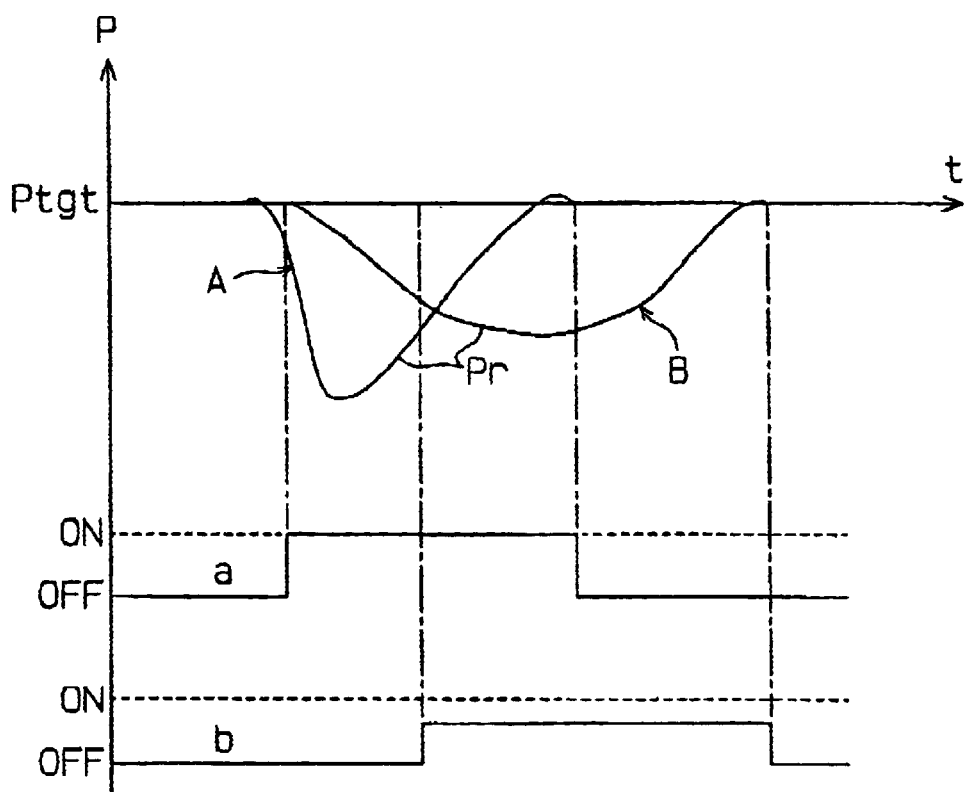
FIG. 6 is a graph showing the relationship between power hydraulic pressure of the accumulator and an operating condition of the hydraulic pressure pump.

The graph illustrated in FIG. 6 shows the relationship between the accumulator hydraulic pressure Pac and the operating condition of the hydraulic pressure pump HP according to the first embodiment of the present invention. Two curved lines "A" and "B" in the graph designate the accumulator hydraulic pressure Pac. The two timing charts "a" and "b" in the graph designate the operating condition of the hydraulic pressure pump HP. When the inclination of the accumulator hydraulic pressure Pac ($\Delta Pr/\Delta t$) is large, the accumulator hydraulic pressure Pac is illustrated by the curved line "A:' and the operating condition of the hydraulic pressure pump HP is illustrated by the timing chart "a". On the other hand, when the inclination of the accumulator hydraulic pressure Pac ($\Delta Pr/\Delta t$) is small, the accumulator hydraulic pressure Pac is illustrated by the curved line "B" and the operating condition of the hydraulic pressure pump HP is illustrated by the time chart "b". As shown in FIG. 6, when the inclination of the accumulator hydraulic pressure Pac ($\Delta Pr/\Delta t$) is large, the hydraulic pressure pump HP is operated at an earlier stage.

The program then proceeds to step 108 to determine whether or not the completion conditions are satisfied to complete the compensating hydraulic pressure into the accumulator AC. At step 108, the complete conditions are satisfied when the pressure value Pr of the accumulator hydraulic pressure Pac detected by the pressure sensor PS has reached the target pressure value Ptgt of the accumulator hydraulic pressure Pac. When the pressure value Pr has reached the target pressure value Ptgt, the program proceeds to step 109. When the pressure value Pr has not reached the target pressure value Ptgt, the program returns to the step 107 and repeatedly performs the control for compensating hydraulic pressure into the accumulator AC.

At step 109, the microcomputer CM determines whether or not terminate conditions are satisfied to terminate the control of the electric current supplied to the respective valves IV, DV. The terminate conditions are satisfied when the vehicle's own speed is sufficiently decreased by the automatic brake control to prevent the vehicle from crashing into the vehicle running ahead. When the terminate conditions are satisfied, i.e. when the automatic brake control is terminated, the program proceeds to step 110 to terminate electric current supply to the respective valves IV, DV.

Electric current supplied to the respective valves IV, DV at step 105 is determined as follow. A required vehicle decreasing speed is calculated based upon the inter-vehicle distance towards the vehicle running ahead as detected by the sensor VD and the vehicle's own speed calculated by the vehicle wheel rotating speed detected by the sensor WS. Based upon the calculated vehicle decreasing speed, the hydraulic pressure to be supplied to the wheel brake cylinders WC is calculated. That is, the hydraulic pressure PMC to be generated by the master cylinder MC is calculated. The relationship between the hydraulic pressure PMC to be generated by the master cylinder MC and the hydraulic pressure PRG to be fed into the regulator RG from the auxiliary hydraulic pressure source AS is described by the following equation: PMC=$\alpha$·PRG ($\alpha$=constant value). Therefore, the hydraulic pressure PRG to be fed into the regulator RG from the auxiliary hydraulic pressure source AS is described by the equation: PRG=PMC/$\alpha$. That is, the hydraulic pressure PRG is determined based upon the hydraulic pressure PMC to be generated by the master cylinder MC. Accordingly, the electric current supplied to the respective valves IV, DV is determined corresponding to the hydraulic pressure PRG to be fed into the regulator RG.

Figure 8:
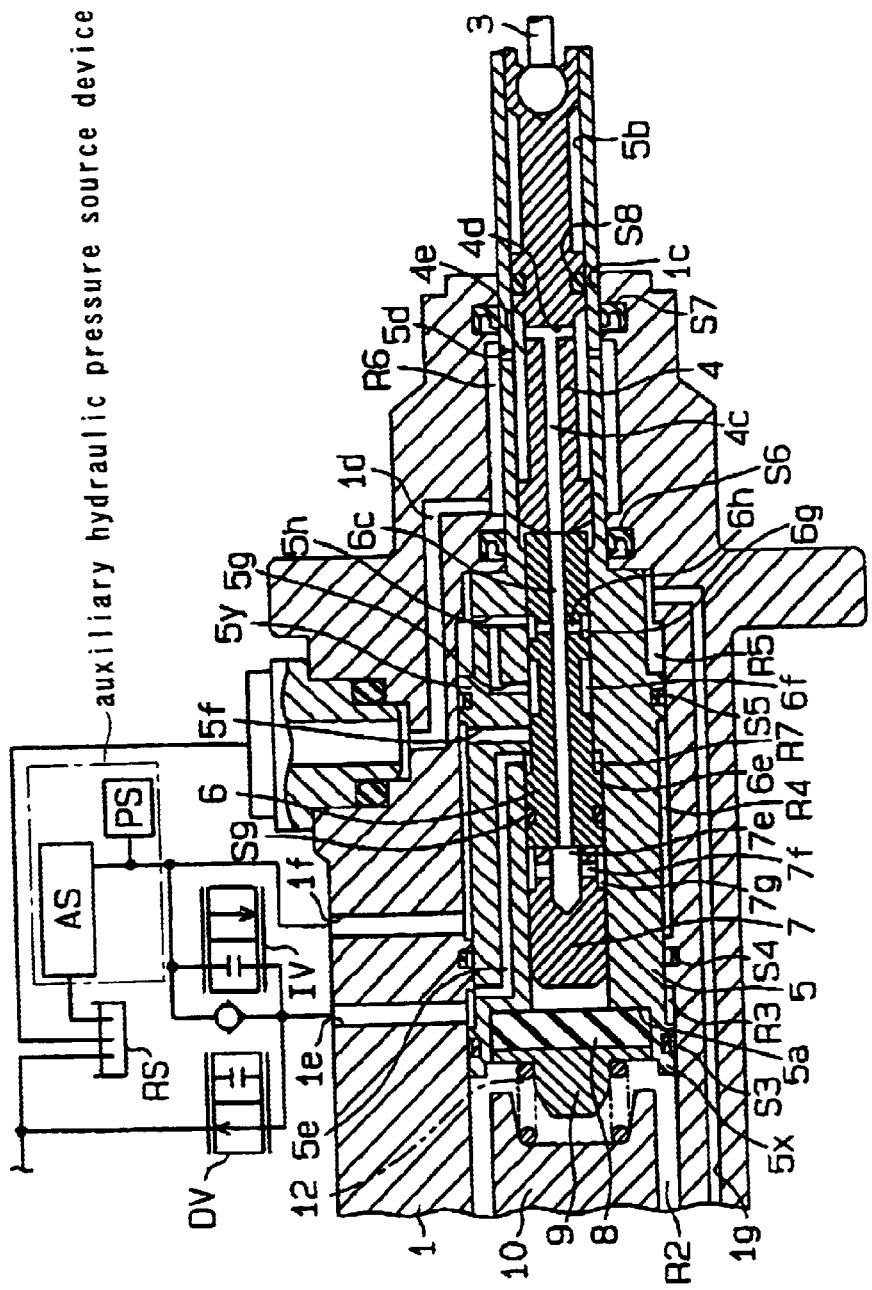
FIG. 8 is an enlarged cross-sectional view of the hydraulic pressure booster included in the vehicle brake system illustrated in FIG. 1.
Figure 9:
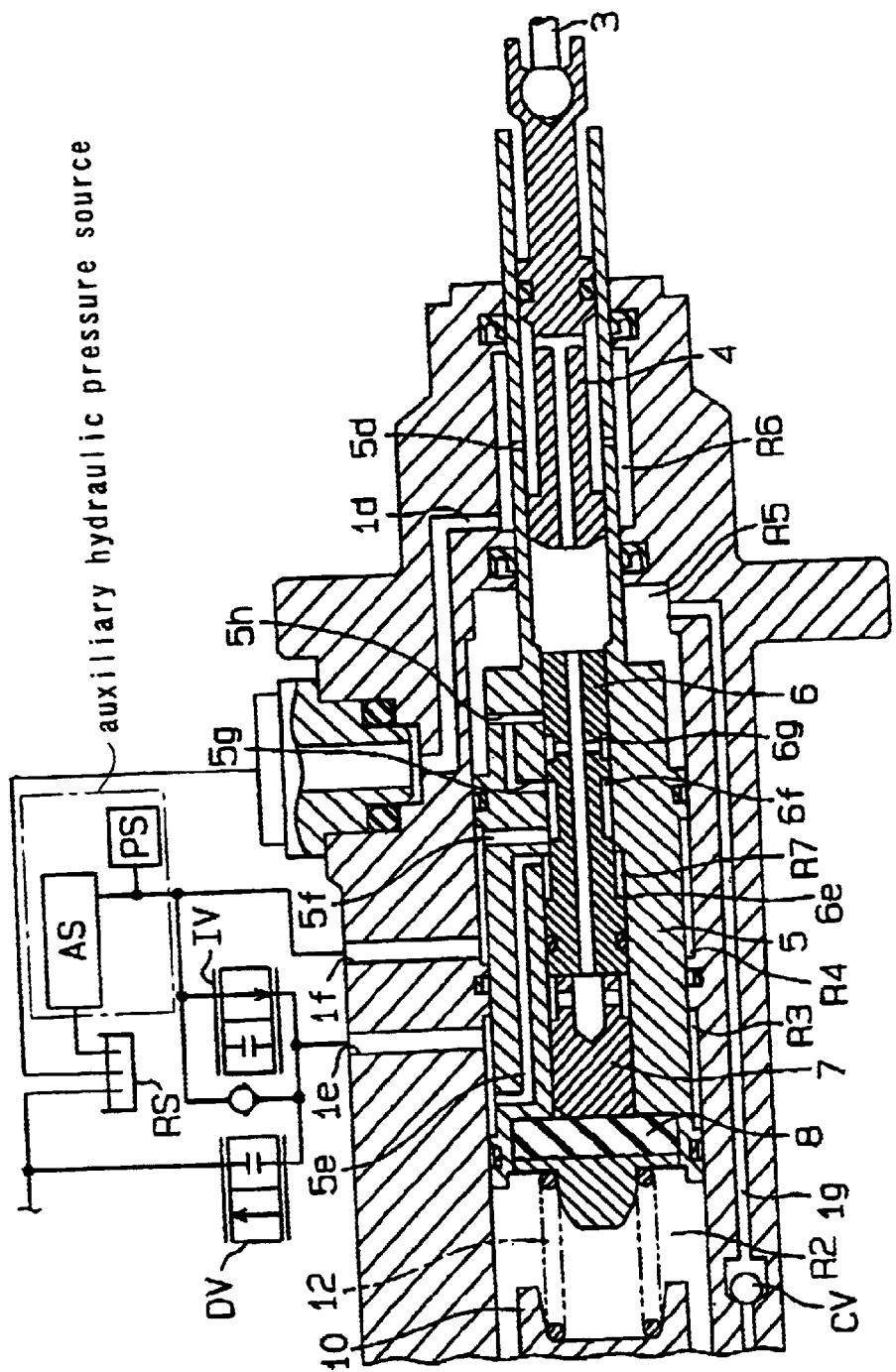
FIG. 9 is an enlarged cross-sectional view of the hydraulic pressure booster illustrated in FIG. 8 under an operated condition.

FIGS. 7, 8 and 9 are cross-sectional views of the hydraulic pressure booster HB. The hydraulic pressure booster HB according to a first embodiment of the present invention includes the regulator RG and the auxiliary hydraulic pressure source AS. A depressing force applied to the brake pedal BP is transmitted as a brake operating force via an input rod 3. The brake hydraulic pressure is outputted from the master cylinder MC in response to the brake operating force. When the control means CT judges that the automatic brake control is required, brake hydraulic pressure adjusted by the hydraulic pressure booster HB is outputted from the master cylinder MC and is supplied to each wheel brake cylinder WC mounted on the respective vehicle wheels.

Referring to FIG. 7, a housing 1 forming a part of the master cylinder MC is provided with a cylinder bore 1a and another cylinder bore 1b, with the diameter of the cylinder bore 1b being larger than the diameter of the cylinder bore 1a. Several fluid supply ports 1i, 1j and several outlet ports 1k, 1n are defined in the housing 1. The outlet port 1k communicates with a first pressure chamber R1 and also communicates with the wheel brake cylinders mounted on the respective vehicle front wheels. The outlet port 1n communicates with a second pressure chamber R2 and also communicates with the wheel brake cylinders mounted on the respective vehicle rear wheels.

Two annular cup-like sealing members S1, S2 are disposed in the housing 1. A master piston 10 (identical to the master piston MP illustrated in FIG. 1) and a power piston 5 are accommodated in series in the housing 1. The master piston 10 is a cylindrical shaped structure having a bottom at one end. The master piston 10 is supported in a fluid-tight and slidable manner by the sealing members S1, S2, with the first pressure chamber R1 being defined ahead of the master piston 10. The power piston 5 is accommodated behind the master piston 10 and is supported in a fluid-tight and slidable manner by an opening portion 1c of the housing defined at a rearward end portion of the housing 1. The second pressure chamber R2 is defined between the master piston 10 and the power piston 5.

A return spring 11 extends between a front end surface of the interior of the housing 1 and a recessed bottom surface of the master piston 10. This return spring 11 biases the master piston 10 in the rearward direction. The master piston 10 is provided with an engaging portion 10f. The engaging portion 10f is formed at the front edge of the master piston 10 and is bent outwardly. The engaging portion 10f engages a stepped portion of the housing 1 to limit rearward movement of the master piston 10. At the rear end position of the master piston 10 under a non-operated condition, the first pressure chamber R1 communicates with the reservoir RS via a communicating hole 10e defined in a skirt portion of the master piston 10 and the fluid supply port 1i.

As shown in FIG. 8, the power piston 5 is provided with two land portions 5x, 5y. A sealing member S3 is disposed in the land portion 5x and a sealing member S5 is disposed in the land portion 5y. Another sealing member S4 is positioned between the sealing members S3, S5 at the inner surface of the housing 1. Two annular cup-like sealing members S6, S7 are disposed in the rearward portion of the housing 1. An annular chamber R6 is defined between the inner surface of the housing 1 and the outer surface of the power piston 5. When the above sealing members S1–S7 are disposed as illustrated in FIGS. 7 and 8, the housing 1 needs to be formed of a plurality of cylinders and the power piston 5 needs to be divided into two members. However, for purposes of this description here, the housing 1 and the power piston 5 are respectively described in the context of a single unit according to the first embodiment of the present invention.

The second pressure chamber R2 is defined between the sealing members S2, S3. An annular chamber R3 is defined between the sealing members S3, S4 and another annular chamber R4 is defined between the sealing members S4, S5. In addition, a power chamber R5 is defined between the sealing members S5, S6. A recessed end portion 5a is provided at the forward end portion of the power piston 5 and a stepped hollow portion 5b is formed behind the recessed portion 5a. A communicating hole 5e is defined in the power piston 5 for connecting the hollow portion 5b with the annular chamber R3. A communicating hole 5f is also defined in the power piston 5 for connecting the hollow portion 5b with the annular chamber R4. Two communicating holes 5g, 5h are defined in the power piston 5 for connecting the hollow portion 5b with the power chamber R5. Also, a communicating hole 5d is defined in the power piston 5 for connecting the hollow portion 5b with the annular chamber R6.

An input member 4 is disposed in a fluid-tight and slidable manner in the rearward portion of the hollow portion 5b of the power piston 5 via a sealing member S8. The input rod 3 is connected to the rearward portion of the input member 4. An axially extending communicating hole 4c is defined in the input member and a radially extending communicating hole 4d is also defined in the input member 4. The radially extending communicating hole 4d communicates with the communicating hole 4c and further communicates a drain port 1d via an annular hole or recess 4e, the communicating hole 5d, and the annular chamber R6.

A spool 6 is accommodated in a fluid-tight and slidable manner via a sealing member S9 at a position forward of the input member 4. A plunger 7 is slidably accommodated at a position forward of the spool 6. A rubber made reaction disc 8 is disposed in the recessed portion 5a. The rubber made reaction disc 8 is an elastic member for transmitting a reaction force. A pressure receiving member 9 is axially movably accommodated at a position forward of the reaction disc 8 and is firmly in contact with the reaction disc 8. A return spring 12 extends between the pressure receiving member 9 and the master piston 10 so as to perform a direct force transmission therebetween. A slight clearance is defined between the reaction disc 8 and the front end surface of the plunger 7 when the hydraulic pressure booster HB is under a non-operated condition as shown in FIGS. 7 and 8.

As shown in FIG. 8, an axially extending communicating hole 6c is defined in the spool 6 and the outer surface of the spool 6 is provided with a stepped portion 6e. Two annular grooves 6f, 6g are defined at the outer surface of the spool 6. The communicating hole 6c is connected to the annular groove 6g via the communicating hole 6h. When the hydraulic pressure booster HB is not operated as shown in FIG. 8, the respective annular grooves 6f, 6g face an opening portion of the respective communicating holes 5g, 5h. Therefore, the power chamber R5 communicates with communicating hole 6c via the communicating hole 5h, the annular groove 6g, and the communicating hole 6h. When the spool 6 is moved in the forward direction as shown in FIG. 9, the communication between the power chamber R5 and the communicating hole 6c is interrupted.

The annular groove 6f faces towards the opening portion of the respective communicating holes 5f, 5g. Therefore, the power chamber R5 communicates with the inlet port 1f. A hydraulic pressure introducing chamber R7 is defined rearwardly of the stepped portion 6e of the spool 6. When automatic brake control is performed, power hydraulic pressure outputted from the auxiliary hydraulic pressure source AS is supplied to the hydraulic pressure introducing chamber R7 via the communicating hole 5e. A hydraulic chamber is defined between a rearward edge of the spool 6 and the input member 4. The hydraulic chamber communicates with the reservoir RS but is separated from the hydraulic pressure introducing chamber R7.

An annular groove 7g is defined in the outer surface of the plunger 7 at the rearward portion of the plunger 7. An axially extending hole 7e is also defined in the plunger 7 and opens in the rearward direction of the plunger 7. The axially extending hole 7e faces a forward opening portion of the communicating hole 6c. The axially extending hole 7e communicates with the annular groove 7g via a radially extending communicating hole 7f. A space in which is disposed the plunger 7 communicates with the drain port 1d via the communicating hole 6c, the communicating holes 4c, 4d, the annular groove 4e, the communicating hole 5d, and the annular chamber R6.

The inlet ports 1e, 1f, and the drain port 1d are defined toward the rearward direction of the housing 1. The inlet ports 1e, 1f are connected to the auxiliary hydraulic pressure source AS while the drain port 1d is connected to the reservoir RS. The inlet port 1e communicates with the annular chamber R3. The inlet port 1e is connected to the auxiliary hydraulic pressure source AS via the pressure increasing valve IV and is also connected to the reservoir RS via the pressure decreasing valve DV.

Further, according to the first embodiment of the present invention, a fluid passage 1g is defined in the housing 1 as shown in FIGS. 7 and 8 for connecting the second pressure chamber R2 and the power chamber R5. A normally-open type pressure differential responsive check valve CV (hereinafter referred to as a check valve CV) is disposed in the fluid passage 1g. The check valve CV normally connects the second pressure chamber R2 with the power chamber R5. The check valve CV is operated for being closed based on the pressure differential between the power chamber R5 and the second pressure chamber R2. When the hydraulic pressure in the power chamber R5 is larger than the hydraulic pressure in the second pressure chamber R2, and the pressure differential between the two chambers is equal to or greater than a predetermined pressure value, the check valve CV is closed, whereby the communication between the power chamber R5 and the second pressure chamber R2 is interrupted. On the other hand, under a non-operative condition, no pressure is applied to the chambers R2, R5 and so the check valve CV is maintained at the open position. Therefore, when the pressure chamber R2 is required to be filled with brake fluid, an evacuation of the air in the pressure chamber R2 can be performed relatively easily and accurately by bleeding air from the power chamber R5 and by feeding brake fluid from the reservoir RS via the fluid supply port 1j.

The overall operation of the hydraulic pressure brake system with the above-described structure is as follow. When the brake pedal BP is under a non-operative condition, the respective components of the hydraulic pressure brake system are positioned as shown in FIGS. 7 and 8. The pressure increase valve IV is operated to be closed and the pressure decrease valve DV is operated to be opened. In addition, the hydraulic pressure booster HB is in the non-operated condition. The annular chamber R4 is connected to the accumulator AC of the auxiliary hydraulic pressure source AS, and yet the communication between the communicating hole 5f and the power chamber R5 is blocked by the spool 6. The power chamber R5 communicates with the reservoir RS via the communicating hole 5h, the annular groove 6g, the communicating holes 6h, 6c, the communicating holes 4c, 4d, the annular groove 4e, the communicating hole 5d, the annular chamber R6 and the drain port 1d. Further, the power chamber R5 communicates with the second pressure chamber R2 via the fluid passage 1g and the check valve CV. Therefore, when the auxiliary hydraulic pressure source AS is activated, the power piston 5 is applied only with a rearward biasing force by hydraulic pressure in the annular chamber R4. Therefore, the power piston 5 is maintained at a stop position illustrated in FIGS. 7 and 8.

When the automatic brake control is performed with the brake pedal BP under the non-operative condition, the pressure increase valve IV is operated to be opened and the pressure decrease valve DV is operated to be closed as shown in FIG. 9. However, immediately after the automatic brake control is initially performed, the initial positions of the respective components of the hydraulic pressure booster HB are the same as the positions of the respective components illustrated in FIG. 8. Therefore, power hydraulic pressure outputted from the auxiliary hydraulic pressure source AS is introduced into the hydraulic pressure introducing chamber R7 via the inlet port ie and the communicating hole 5e, whereby the spool 6 is moved in the forward direction and is ultimately positioned as illustrated in FIG. 9. The power chamber R5 communicates with the auxiliary hydraulic pressure source AS via the communicating hole 5g, the annular groove 6f, the communicating hole 5f, and the inlet port 1f, whereby the power piston 5 is moved in the forward direction. Corresponding to the forward movement of the power piston 5, the master piston 10 is moved forward. Therefore, brake hydraulic pressure is supplied to each vehicle wheel brake cylinder.

Figure 10:
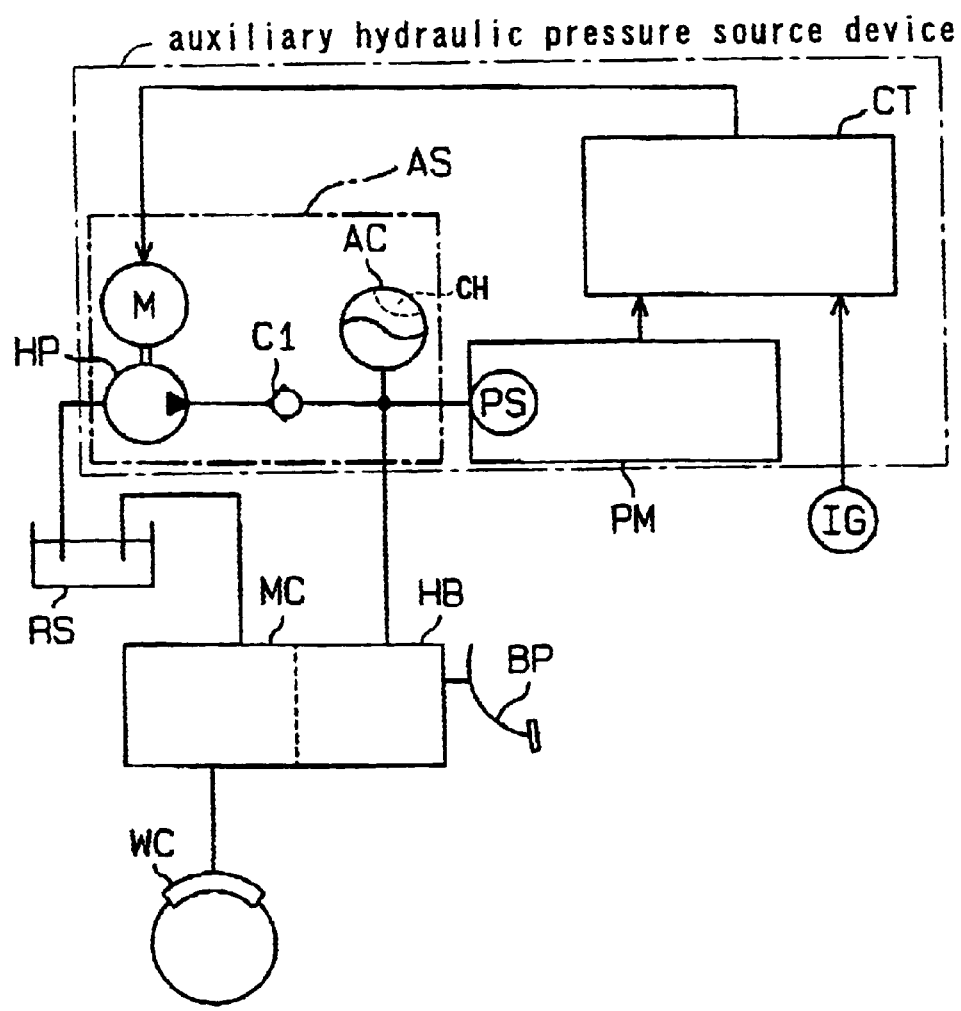
FIG. 10 is a schematic illustration of a vehicle brake system provided with an auxiliary hydraulic pressure source according to a second embodiment of the present invention.

FIG. 10 illustrates the brake system for the vehicle according to a second embodiment of the present invention is described below. Elements that are identical to those illustrated in FIG. 1 are identified with the same reference numbers and a detailed description of those components of the vehicle brake system according to the second embodiment is not repeated to simplify the description.

The pressure sensor PS is connected to the accumulator AC and consecutively or continuously detects the accumulator hydraulic pressure Pac which corresponds to the power hydraulic pressure outputted from the auxiliary hydraulic pressure source AS. The accumulator hydraulic pressure Pac is monitored by a hydraulic pressure monitoring means PM. The hydraulic pressure pump HP is controlled by the control means CT based upon the accumulator hydraulic pressure Pac detected by the pressure sensor PS and monitored by the hydraulic pressure monitoring means PM. More specifically, the accumulator hydraulic pressure Pac is compared with a reference pressure value Pon and a reference pressure value Poff. The reference pressure value Pon is always set to be smaller than the reference pressure value Poff. The reference pressure value Pon is a reference pressure level of the accumulator hydraulic pressure Pac when the hydraulic pressure pump is initially actuated. The reference pressure value Poff is a reference pressure level of the accumulator hydraulic pressure Pac when the hydraulic pressure pump is stopped. When the accumulator hydraulic pressure Pac monitored by the monitoring means PM is below the reference pressure value Pon, the electric motor M is driven and the hydraulic pressure pump HP is actuated by the electric motor M. When the accumulator hydraulic pressure Pac monitored by the monitoring means PM is equal to or above the reference pressure value Poff, the hydraulic pressure pump HP and the electric motor M are stopped.

Figure 13:
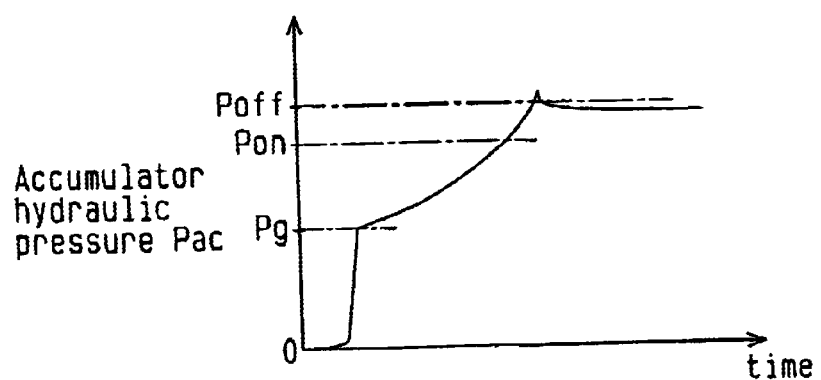
FIG. 13 is a graph showing the hydraulic pressure characteristics of an accumulator according to the second embodiment of the present invention.

As shown by a solid line in the graph of FIG. 13, when the accumulator AC is normally operated, the accumulator hydraulic pressure Pac reaches a sealing pressure Pg in a gas-sealed chamber (schematically shown by way of example in FIG. 10 and identified as CH) of the accumulator AC corresponding to the operation of the hydraulic pressure pump HP driven by the electric motor M. After reaching a pressure level of the sealing pressure Pg, the accumulator hydraulic pressure Pac is gradually increased corresponding to the passage of time. When the accumulator hydraulic pressure Pac then reaches the reference pressure value Poff, the electric motor M and the hydraulic pressure pump HP are stopped so that the accumulator hydraulic pressure Pac is maintained at a pressure level slightly below the reference pressure value Poff. Although not illustrated in FIG. 4, when the accumulator hydraulic pressure Pac is then decreased and reaches the reference pressure value Pon, the electric motor M is driven again so that the accumulator hydraulic pressure Pac is maintained to be equal to or above the reference pressure value Pon. Therefore, the accumulator hydraulic pressure Pac is maintained to be equal to or above the reference pressure value Pon and to be below the reference pressure value Poff.

Figure 14:
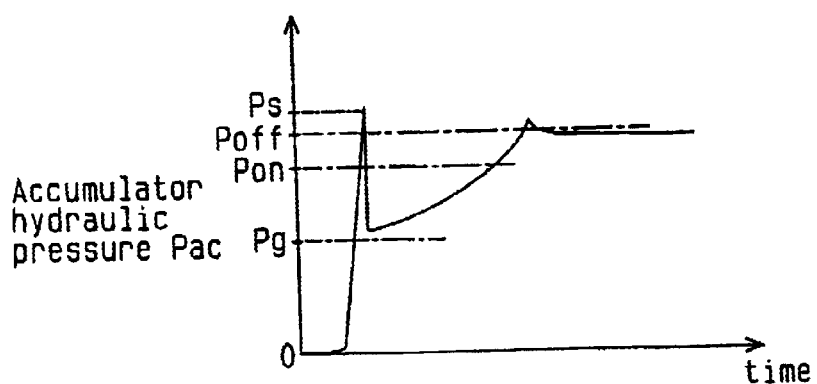
FIG. 14 is a graph showing the hydraulic pressure characteristics of the accumulator under a malfunction condition when the accumulator is initially operated.

When the hydraulic pressure pump HP is driven by the electric motor M in the situation where the accumulator AC malfunctions for some reason, for example if a piston is not movable in the accumulator AC, the accumulator hydraulic pressure Pac is increased rapidly as shown by a solid line illustrated in FIG. 14. When the accumulator hydraulic pressure Pac reaches the reference pressure value Poff, the hydraulic pressure pump HP is stopped. In this case, if the hydraulic pressure pump HP is not actuated again, the accumulator hydraulic pressure Pac is increased rapidly, even though fluid in the accumulator AC is not increased as illustrated by a broken line shown in FIG. 15.

Figure 15:
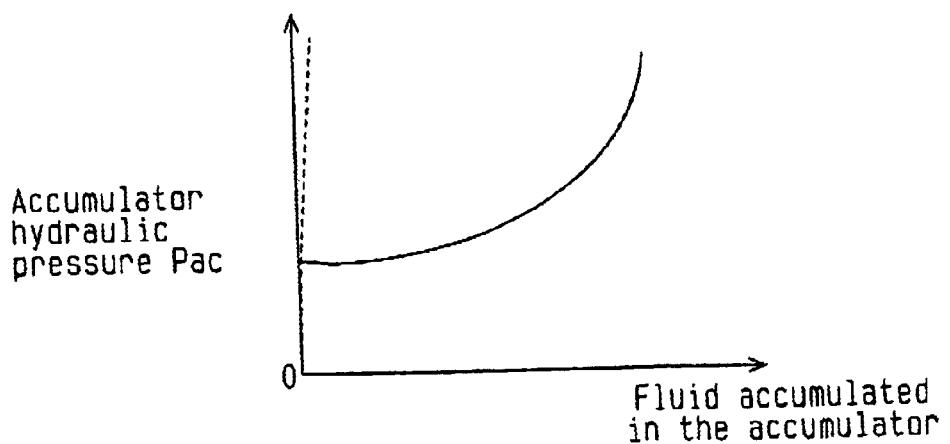
FIG. 15 is a graph showing the characteristics of the accumulator hydraulic pressure and fluid accumulated in the accumulator according to the second embodiment of the present invention.

Referring to FIG. 15, the broken line designates the relationship between the accumulator hydraulic pressure Pac and the fluid accumulated in the accumulator AC when the hydraulic pressure pump HP is not actuated, whereby the fluid accumulated in the accumulator AC is not increased. The solid curved line illustrated in FIG. 15 identifies the relationship between the accumulator hydraulic pressure Pac and the fluid accumulated in the accumulator AC when the hydraulic pressure pump HP is actuated, whereby the fluid accumulated in the accumulator AC is increased.

According to the second embodiment of the present invention, even when the accumulator hydraulic pressure Pac reaches the reference pressure value Poff, the hydraulic pressure pump HP is maintained to be actuated for a predetermined time. Therefore, when the accumulator hydraulic pressure Pac reaches a starting pressure Ps for starting accumulating fluid in the accumulator AC, the piston is again moved in the accumulator AC so that the fluid accumulated in the accumulator AC is increased. As shown by the solid line in FIG. 14, when the fluid accumulated in the accumulator AC is initially increased at the point of the starting pressure Ps, the accumulator hydraulic pressure Pac is decreased rapidly. However, after the rapid decrease, the accumulator hydraulic pressure Pac is increased corresponding to the increase of the fluid accumulated in the accumulator AC. Therefore, according to the second embodiment of the present invention, fluid can be accumulated in the accumulator AC in a proper manner. The starting pressure Ps is a pressure level when the piston of the accumulator AC is recovered from a condition that the piston cannot be moved properly and is then moved properly once again. The pressure level of the starting pressure Ps is equal to or above the pressure level of the reference pressure value Poff.

The control means CT includes a calculating means for calculating the pressure change of the accumulator hydraulic pressure Pac per unit of time based upon the accumulator hydraulic pressure Pac monitored by the hydraulic pressure monitoring means PM. The pressure value calculated by the calculating means is compared with a predetermined pressure value Kp. When the control means CT determines that the calculated pressure value is larger than the predetermined pressure value Kp even if the accumulator hydraulic pressure Pac monitored by the hydraulic pressure monitoring means PM is equal to or above the reference pressure value Poff, the hydraulic pressure pump HP will be maintained under an active condition.

If desired, the hydraulic pressure pump HP may be maintained under the active condition for a predetermined time only when the hydraulic pressure pump HP is initially actuated with an ignition switch IG turned ON as far as the calculated pressure change of the accumulator hydraulic pressure Pac is larger than the predetermined pressure value Kp even if the accumulator hydraulic pressure Pac is equal to or above the reference pressure value Poff.

More specifically, the hydraulic pressure pump HP may be maintained under the active condition for the predetermined time only when the accumulator hydraulic pressure Pac monitored by the hydraulic pressure monitoring means is below a minimum reference value as far as the calculated pressure change of the accumulator hydraulic pressure Pac is larger than the predetermined pressure value Kp even if the accumulator hydraulic pressure Pac is equal to or above the reference pressure value Poff. The minimum reference value in this case is set to be below the reference pressure value Pon, such as the sealing pressure Pg of the gas sealed chamber of the accumulator AC.

Figure 11:
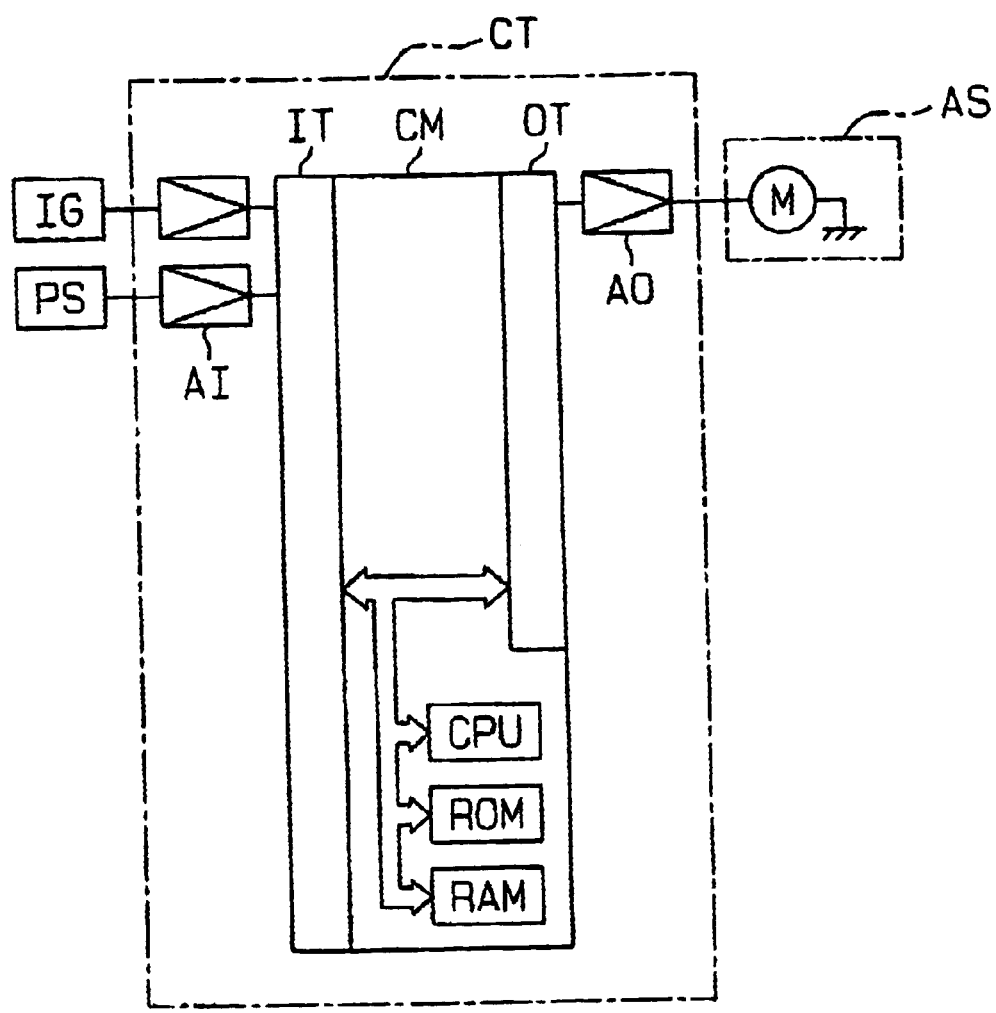
FIG. 11 is a schematic illustration of a control means used in the system illustrated in FIG. 10.

FIG. 11 illustrates the control means CT, with elements of the control means CT shown in FIG. 11 that correspond to elements of the control means described above being identified by the same reference numerals. For purposes of simplifying the description, a detailed description of such elements is not repeated here.

Figure 12:
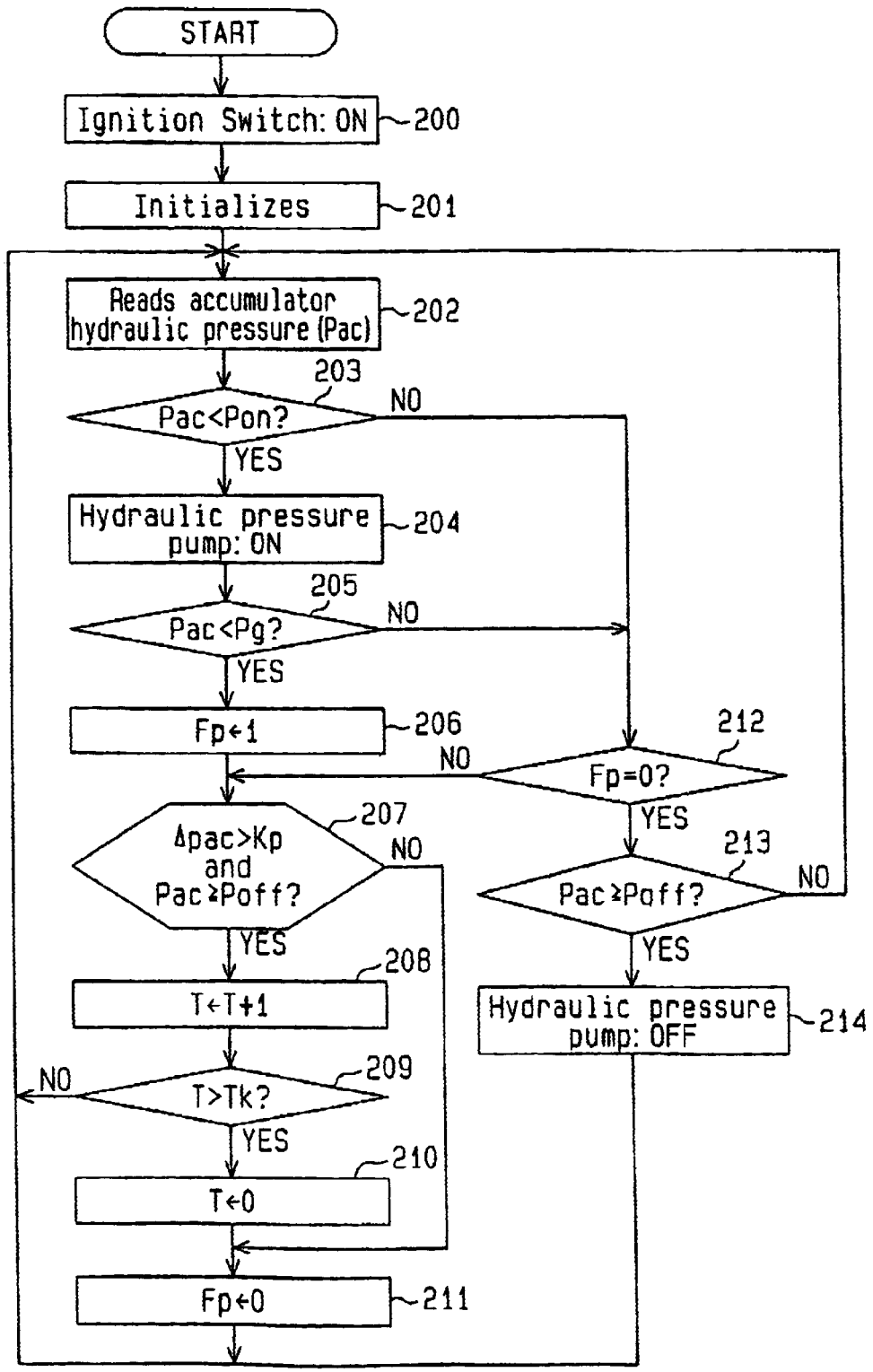
FIG. 12 is a flow chart illustrating a program for controlling the operation of a hydraulic pressure pump according to the second embodiment of the present invention.

The control of the hydraulic pressure pump HP by the control means CT according to the second embodiment of the present invention is described below with reference to the flow chart illustrated in FIG. 12. At step 200, the ignition switch IG is turned ON. At step 201, the microcomputer CM is initialized and various calculated values are cleared. At step 202, the microcomputer CM reads the signal detected by the pressure sensor PS which designates the accumulator hydraulic pressure Pac. At step 203, the accumulator hydraulic pressure Pac is compared with the reference pressure value Pon. When the accumulator hydraulic pressure Pac is below the reference pressure value Pon, the program then proceeds to step 204. At the step 204, the hydraulic pressure pump HP is turned ON. The program then proceeds to step 205. On the other hand, when the accumulator hydraulic pressure Pac is determined to be equal to or greater than the reference pressure value Pon at step 203, the program proceeds to step 112.

At step 205, the microcomputer CM determines whether or not the accumulator hydraulic pressure Pac is below the charged pressure Pg in the gas sealed chamber of the accumulator AC. When the accumulator hydraulic pressure Pac is below the charged pressure Pg, the program proceeds to step 206. At the step 206, a flag Fp of the hydraulic pressure pump HP is set to "1". The flag Fp is set at "1" when the hydraulic pressure pump HP has been actuated. The flag Fp is set to "0" when the hydraulic pressure pump HP has not been actuated. At step 207, the pressure change of the accumulator hydraulic pressure Pac per unit of time, i.e., the increment of pressure increase ($\Delta$Pac), is compared with the predetermined pressure value Kp. Also in step 207, the accumulator hydraulic pressure Pac is compared with the reference pressure value Poff. When the increment of the pressure increase ($\Delta$Pac) is larger than the predetermined value Kp and the accumulator hydraulic pressure Pac is equal to or above the reference pressure value Poff, the program then proceeds to step 208. From step 208 to step 210, the hydraulic pressure pump HP is maintained under an active condition for a predetermined time Tk. The predetermined time Tk is the time required for the accumulator hydraulic pressure Pac to rise from zero up to the reference pressure value Poff when the accumulator is normally operating.

At step 208, a timer T is incremented (T+1). At step 209, the microcomputer CM determines whether or not a counted value by the timer T is larger than the predetermined time Tk. When the counted value by the timer T is equal to or below the predetermined time Tk, the program returns to step 202. When the counted value by the timer T is larger than the predetermined time Tk, the program proceeds to step 210. At step 210, the counted value by the timer T is cleared to "0". Then at step 211, the flag Fp of the hydraulic pressure pump HP is cleared to "0". The program ultimately returns to step 202.

When the program determines at step 203 that the accumulator hydraulic pressure Pac is equal to or above the reference pressure value Pon, the program proceeds to step 212. Similarly, when the program determines that the accumulator hydraulic pressure Pac is equal to or greater than the sealing pressure Pg at step 205, the program proceeds to step 212. At step 212, the program determines whether or not the flag Fp is set at "0". When it is determined at step 212 that the flag Fp is set at "1", it designates that the hydraulic pressure pump HP has been still actuated through steps 207, 208 209. Therefore, the program proceeds to step 207. When it is determined at step 212 that the flag Fp is set to "0", it designates a stage after the hydraulic pressure pump HP was cleared to "0" at step 211. Therefore, the program proceeds to step 213.

At step 213, the accumulator hydraulic pressure Pac is compared with the reference pressure value Poff. When the accumulator hydraulic pressure Pac is below the reference pressure value Poff, the program directly returns to step 202. However, when the accumulator hydraulic pressure Pac is equal to or greater than the reference pressure value Poff, the program first proceeds to step 214 at which the hydraulic pressure pump HP is stopped. The program then ultimately returns to step 202 and repeatedly performs the above-described routine.

As shown by the solid line in FIG. 14, the accumulator hydraulic pressure Pac is increased rapidly when the hydraulic pressure pump HP is actuated in the case where the accumulator AC malfunctions. According to the second embodiment of the present invention, the hydraulic pressure pump HP is maintained under an active condition for the predetermined time TK through steps 207, 208, 209, even when the accumulator hydraulic pressure Pac reaches the reference pressure value Poff. Therefore, the accumulator hydraulic pressure Pac reaches the starting pressure Ps, wherein the fluid accumulated in the accumulator AC is increased. Therefore, the fluid can be properly accumulated in the accumulator AC.

According to the described embodiments of the present invention, the auxiliary hydraulic pressure source AS is provided for the vehicle hydraulic pressure brake system. However, the auxiliary hydraulic pressure source AS is not limited to being provided for the vehicle hydraulic pressure brake system and may be provided for other vehicle systems including a vehicle hydraulic pressure suspension system.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. An auxiliary hydraulic pressure source device for a vehicle comprising:

a hydraulic pressure pump for pressurizing and discharging fluid;

an accumulator for accumulating the fluid pressurized and discharged by the hydraulic pressure pump;

hydraulic pressure detecting means for detecting accumulator hydraulic pressure continuously; and control means for controlling operation of the hydraulic pressure pump in accordance with a comparison result obtained by comparing a detection result of the hydraulic pressure detecting means with a predetermined pump-drive-starting reference pressure and a predetermined pump-drive-stopping reference pressure, the control means comprising;

pressure change calculating means for calculating a pressure change of the accumulator hydraulic pressure per unit time based upon the detection result of the hydraulic pressure detecting means;

comparing means for comparing a calculation result of the pressure change calculating means with a predetermined value; and adjusting means for maintaining driving operation of the hydraulic pressure pump for a predetermined time when the calculation result of the pressure change calculating means is more than the predetermined value even if the detection result of the hydraulic pressure detecting means is equal to or greater than the predetermined pump-drive-stopping reference pressure.

2. The auxiliary hydraulic pressure source device for the vehicle according to claim 1, wherein the adjusting means maintains the driving operation of the hydraulic pressure pump for a predetermined time when the calculation result of the pressure change calculating means is greater than the predetermined value even if the detection result of the hydraulic pressure detecting means is equal to or greater than the predetermined pump-drive-stopping reference pressure, only when the hydraulic pressure pump is driven for the first time after starting a vehicle engine.

3. The auxiliary hydraulic pressure source device for the vehicle according to claim 1, wherein the adjusting means maintains the driving operation of the hydraulic pressure pump for a predetermined time when the calculation result of the pressure change calculating means is greater than the predetermined value even if the detection result of the hydraulic pressure detecting means is equal to or greater than the predetermined pump-drive-stopping reference pressure, only when the detection result of the hydraulic pressure detecting means is less than a minimum reference pressure which is less than the predetermined pump-drive-starting reference pressure the moment a vehicle engine is started.

4. The auxiliary hydraulic pressure source device for the vehicle according to claim 3, wherein the minimum reference pressure is a pressure in a gas-sealed chamber of the accumulator.

* * * * *